United States Patent [19]

Doerter

[11] 4,296,533
[45] Oct. 27, 1981

[54] SNAP FASTENER COMPONENT STRIP

[75] Inventor: Randall H. Doerter, Meadville, Pa.

[73] Assignee: Talon, Inc., Meadville, Pa.

[21] Appl. No.: 129,912

[22] Filed: Mar. 13, 1980

[51] Int. Cl.³ ............................................. A44B 17/00
[52] U.S. Cl. .................................... 24/216; 24/213 B; 24/208 A; 264/251
[58] Field of Search ............. 24/216, 217, 213, 208 A; 264/251

[56] References Cited

U.S. PATENT DOCUMENTS

| 1,276,624 | 8/1918 | Cummings | 264/251 |
| 2,775,093 | 12/1956 | Kundert | 24/208 A |
| 2,888,511 | 5/1959 | Guritz | 24/208 A |
| 3,469,290 | 9/1969 | Andrews | 24/208 A |
| 3,553,796 | 1/1971 | Carlile | 24/216 |
| 3,685,105 | 8/1972 | Carlile et al. | 24/213 |
| 3,774,756 | 11/1973 | Carlile et al. | 24/216 |
| 4,096,216 | 6/1978 | Yevick | 264/251 |

FOREIGN PATENT DOCUMENTS

| 845808 | 8/1952 | Fed. Rep. of Germany | 24/208 A |
| 562273 | 5/1957 | Italy | 264/251 |
| 47-33065 | 8/1972 | Japan | 264/251 |
| 94163 | 4/1922 | Sweden | 264/251 |

Primary Examiner—Victor N. Sakran
Attorney, Agent, or Firm—O'Brien & Marks

[57] ABSTRACT

A snap fastener component strip is disclosed as including a series of like square plastic components interconnected by molded plastic portions which are reinforced by continuous polymer monofilaments embedded in the components to provide a strong, flexible strip of components particularly suited to handling by automatic machinery. A method of molding such strips is also disclosed.

5 Claims, 4 Drawing Figures

U.S. Patent
Oct. 27, 1981
4,296,533
FIG. 1
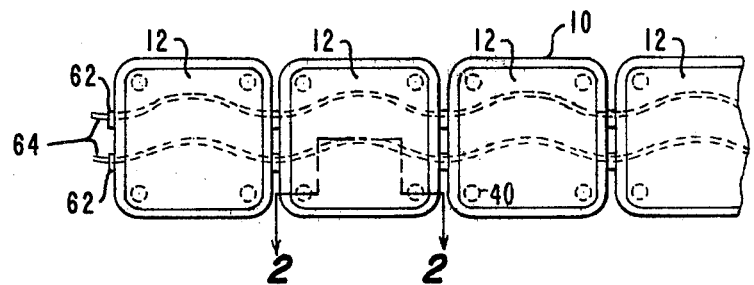
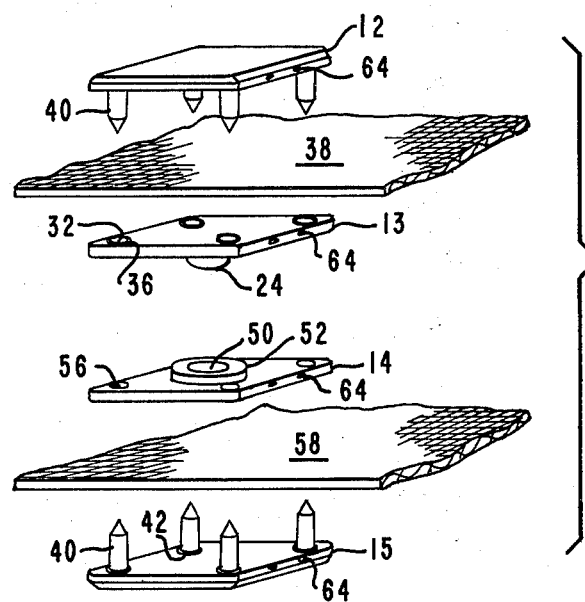
FIG. 3
FIG. 2
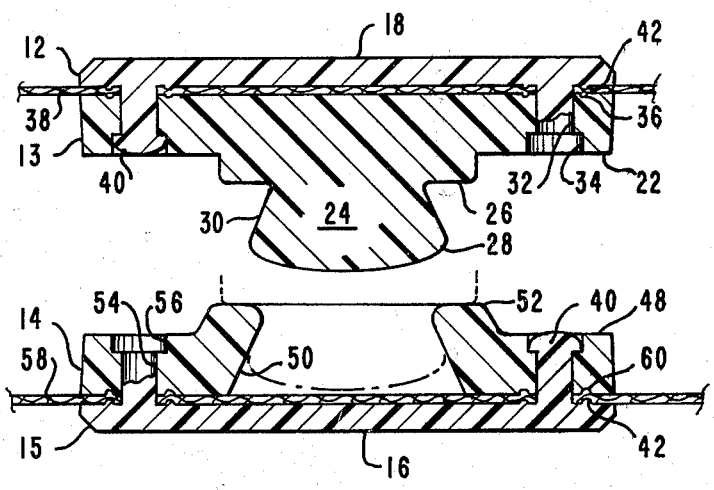
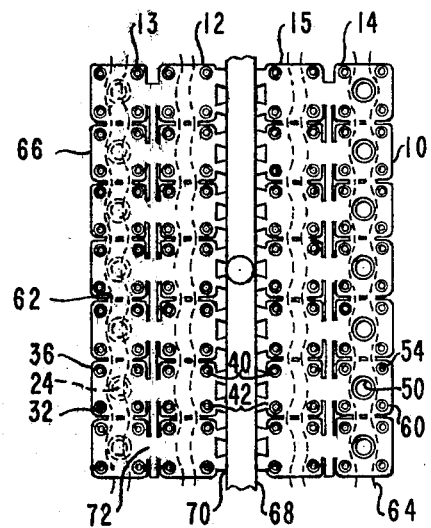
FIG. 4

4,296,533

SNAP FASTENER COMPONENT STRIP

BACKGROUND OF THE INVENTION

1. Field of the Invention

This invention relates to snap fasteners, particularly to strips of components used in the assembly of plastic snaps for garments and the like.

2. Description of the Prior Art

The prior art, as exemplified by U.S. Pat. Nos. 3,553,796 and 3,685,105, discloses plastic snap fastener components connected in series by integral molded plastic portions to form continuous strips of components. While the molded connecting portions do provide such strips with a degree of flexibility and severability that facilitates manipulation of the components by automatic machinery, prior strips have proven too fragile to survive the bending, twisting and tension imposed by certain machinery or storage devices. It is apparent that simply increasing the size of the interconnecting portions would produce increased strip strength, but then strip flexibility would be simultaneously reduced. Such an approach to improving strip strength is inappropriate where substantial flexure is anticipated.

SUMMARY OF THE INVENTION

The invention is summarized in a snap fastener component strip particularly adapted for manipulation by automatic machinery, including a plurality of like plastic components aligned in a row, and a pair of flexible reinforcing filaments extending along the row of components, a portion of each filament being embedded in each component.

An object of the invention is to construct a snap fastener component strip having adequate flexibility to be stored on reels and having sufficient strength to survive manuipulation by automatic machinery such as that used to attach snaps to garments.

Another object of the invention is to provide a low cost reinforcement for a strip of snap fastener components.

A further object of the invention is to create a particularly strong union between plastic components and embedded reinforcing filaments.

BRIEF DESCRIPTION OF THE DRAWING

FIG. 1 is a top plan view of a portion of a snap fastener component strip embodying the present invention;

FIG. 2 is a sectional view taken along the line 2—2 in FIG. 1, with mating components added;

FIG. 3 is an exploded perspective view of FIG. 2; and

FIG. 4 is a top plan view of an array of the components shown in FIG. 3.

DESCRIPTION OF THE PREFERRED EMBODIMENT

Referring to FIG. 1, the invention is embodied in a strip 10 of like plastic components 12 for a snap fastener. Although, as shown in FIGS. 2 and 3, an assembled snap includes four different components designated 12, 13, 14 and 15, FIG. 1 shows a representative series of only one particular component 12. It should be understood that the invention equally embraces similar strips (not shown) of components 13, 14 or 15, and in fact assembled snaps normally will be constructed using components from four distinct strips.

An assembled snap (FIG. 2) includes a female half 16 and a male half 18. The male half 18 has a male component 13 with a first backing component 12 attached thereto as described subsequently, and the female half 16 includes a female component 14 attached to a second backing component 15. The male component 13 has a flat base 22 that supports a central, integral mushroomed stud 24 encircled at its proximal end by an annular shoulder 26. The stud 24 has a rounded head 28 and a frustoconical neck 30 that converges toward the base 22. There is a through hole 32 at each corner of the base 22, each hole 32 having a counterbore 34 on the same side of the base 22 as the stud 24. Annular grooves 36 are formed on the opposite side of the base 22 around each of the holes 32.

A backing component 12 is used to attach the male component 13 to a piece of fabric 38 (FIG. 3) or other sheet material. The backing component 12 has at each of its four corners a pointed frustoconical post 40 which is inserted through the fabric 38 into a corresponding hole 32 in the male component 13. The posts 40 are deformed, as shown in FIG. 2, within the counterbores 34 to form a permanent assembly 18 sandwiching the fabric 38. Annular ridges 42 on the backing component 12 around the base of each post 40 cooperate with the grooves 36 in the male component 13 to clamp the fabric 38 tightly to resist tearing thereof by the posts 40 during use.

The female half 16 of each snap includes a female component 14 having a base 48 with a central tapered through bore 50 diverging away from the male component 13, the bore 50 being sized to receive and retain therein the stud 24. The bore 50 is surrounded by a raised rim 52 on the side of the base 48 nearer the male component 13. The rim 52 abuts the annular shoulder 26 when the snap is joined, as shown by the broken line in FIG. 2, maintaining a clearance between the bases 22 and 48 for the insertion of a fingernail or the like if necessary to separate the snap. The shoulder 26 and the rim 52 also provide a fulcrum point that facilitates separation of the fastener.

Four holes 54, each having a counterbore 56, are formed at the corners of the female component 14 to receive corresponding posts 40 of a backing component 15. An annular groove 60 around each of the holes 54 cooperate with a corresponding ridge 42 on the backing component 15 to resist tearing of the fabric 58.

Referring again to FIG. 1, adjacent like snap components 12 are interconnected in a strip 10 by a pair of integrally molded connecting portions 62 having a very small cross section in comparison to the components themselves. The portions 62 thereby provide flexible, readily severed joints between components 12; however, such joints molded from common plastic snap material such as polyester resin are too easily broken by rough handling or repeated flexure to be suitable for use with certain machinery. Therefore, the strip 10 is provided with a pair of reinforcing filaments 64, preferably polyester monofilaments, which are embedded in each component 12 and in the connecting portions 62 as well. The filaments 64 follow an arcuate path through each component 12, as shown in FIGS. 1 and 4, which enhances the strength of the union between the filaments 64 and the components 12.

The filaments 64 have substantially greater strength and flexibility than do the connecting portions 62 through which they pass, so that the filaments 64 maintain the integrity of the strip 10 even when the molded connecting portions 62 are broken. Despite their strength, however, the filaments 64 are readily severed by cutting, so that individual snaps can be easily separated from the strips when desired. The filaments 64 enable the strip 10 to be stored on a reel, from which the components 12 can be conveniently dispensed.

FIG. 4 shows a portion of a continuous molded array 66 of components 12, 13, 14 and 15. Within the array 66, like components are longitudinally interconnected by molded portions 62 and embedded filaments 64, forming four parallel component strips 10. A sprue 68 formed during the molding process extends longitudinally between the centermost strips, which contain backing members 12 and 15. Runners 70 and 72 interconnect the sprue 68 and the strips 10. The sprue 68 and runners 70 and 72 must of course be severed from the component strips before the components 12, 13, 14 and 15 can be used.

To produce the array 66, four pairs of filaments 64 are placed in an injection mold (not shown), the filaments being supported in the mold only where they pass through the connecting portions 62. The filaments 64 are placed in the mold in a slack condition so as to sag a predetermined amount between the connecting portions 62. The mold is then filled by injecting polymer through the sprue 68 and the runners 70 and 72 to fill the component cavities. The flow of plastic in the mold bows the filaments 64 away from the sprue 68, as shown in FIG. 4, as the filaments 64 are embedded in plastic. The molded array 66 is subsequently cooled and stripped from the mold in a conventional manner, and the four parallel component strips are severed from the runners prior to assembly upon a workpiece.

An advantage of the invention is that it provides a component strip that can be repeatedly flexed without breaking.

Inasmuch as the invention is subject to many modifications, variations and changes in detail, it is intended that all matter contained in the foregoing description or shown in the accompanying drawing shall be interpreted as illustrative and not in a limiting sense.

What is claimed is:

1. A snap fastener component strip particularly adapted for manipulation by automatic machinery comprising a plurality of like plastic snap components aligned in a row, a pair of integrally molded plastic connecting portions joining each pair of adjacent components, and a pair of flexible reinforcing polymer filaments extending along the row of snap components, a portion of each filament being embedded in each component, said filaments having substantially greater flexibility than said molded connecting portions to maintain continuity between components even if said molded connecting portions are broken by flexure.

2. A snap fastener component strip as recited in claim 1 wherein the filaments are polyester monofilaments.

3. A snap fastener component strip as recited in claim 1 or 2 wherein each embedded filament portion is arcuate.

4. A snap fastener component strip as recited in claim 3, one of said filaments being embedded in each of said connecting portions.

5. A snap fastener component strip as recited in claim 4 wherein the filaments are completely embedded in the row of components and the connecting portions.

* * * * *